3,897,997

United States
Kalt

[11] 3,897,997
[45] Aug. 5, 1975

[54] ELECTROSTATIC DISPLAY DEVICE WITH VARIABLE REFLECTIVITY

[76] Inventor: Charles G. Kalt, Hawthorne Rd., Williamstown, Mass. 01267

[22] Filed: Aug. 6, 1974

[21] Appl. No.: 495,189

Related U.S. Application Data

[63] Continuation-in-part of Ser. No. 438,574, Feb. 1, 1974, abandoned, which is a continuation-in-part of Ser. No. 294,590, Oct. 3, 1972, abandoned.

[52] U.S. Cl. ............... 350/161; 350/266; 350/269; 350/285; 178/7.3 D
[51] Int. Cl. ............................................. G02f 1/28
[58] Field of Search ........ 350/160 R, 161, 266, 269, 350/285; 178/7.3 D, 7.5 D

[56] References Cited
UNITED STATES PATENTS

| | | | |
|---|---|---|---|
| 1,984,683 | 12/1934 | Jenkins | 178/6 |
| 3,001,447 | 9/1961 | Ploke | 350/161 |
| 3,089,120 | 5/1963 | Aiken | 340/44 |
| 3,553,364 | 1/1971 | Lee | 350/269 |

*Primary Examiner*—Ronald L. Wibert
*Assistant Examiner*—Paul K. Godwin

[57] ABSTRACT

An electrostatic display device is described having electrically controllable reflectivity to ambient light. A fixed electrode having a curvature of constant radius is mounted adjacent to and insulated from a resilient variable sheet electrode. On at least one of the adjacent faces of the fixed and variable electrodes there lies an insulating layer. When a voltage is applied between the two electrodes, the variable electrode wraps over the fixed electrode changing its appearance. The device is suitable for example for use as an element in a standard seven segment numeric display unit. It requires very low levels of operating power, is capable of exhibiting a wide range of reflectivities, colors and an effective viewing angle of greater than 120° and is effectively operated in high ambient light environments.

15 Claims, 16 Drawing Figures

PATENTED AUG 5 1975
3,897,997
SHEET 1
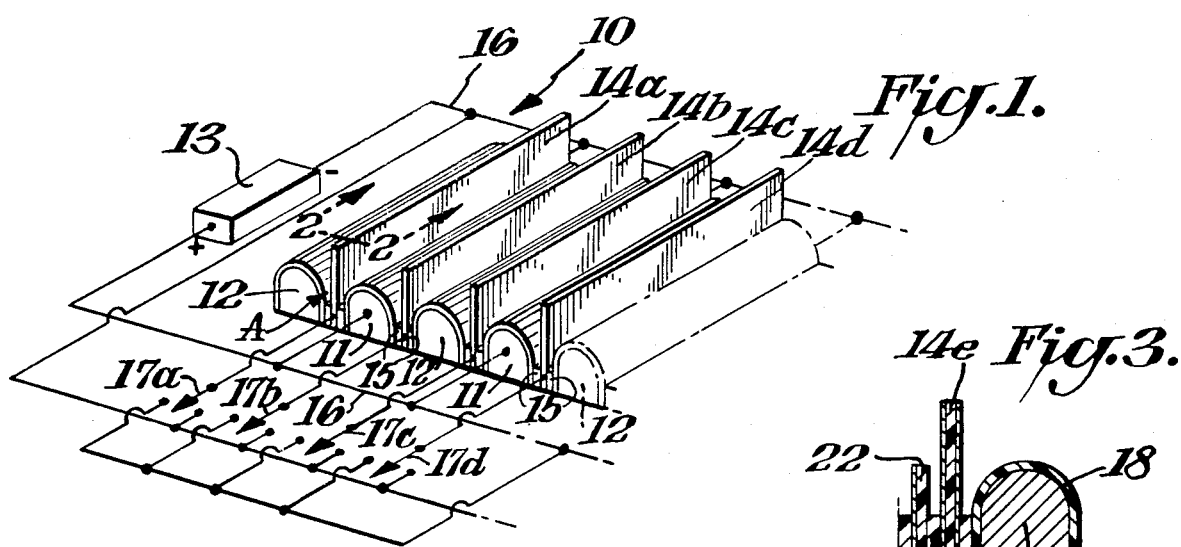
Fig.1.
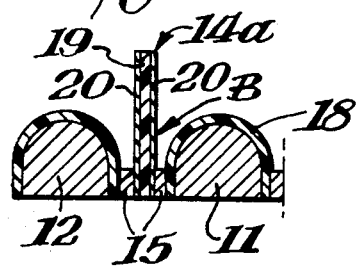
Fig.3.
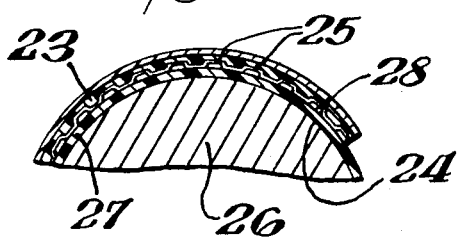
Fig.5. Fig.2.
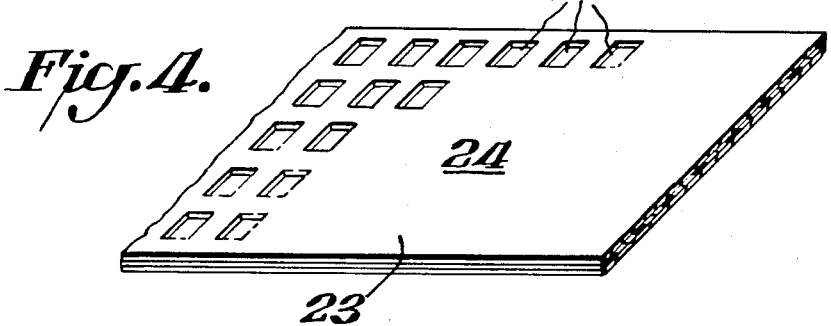
Fig.4.
Fig.6.

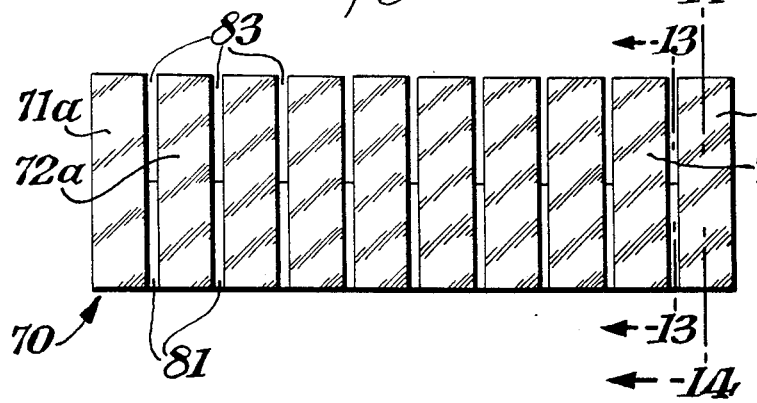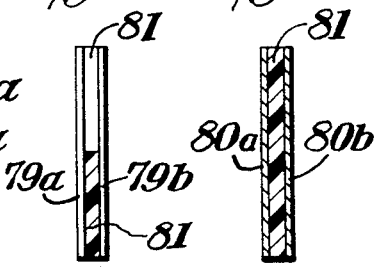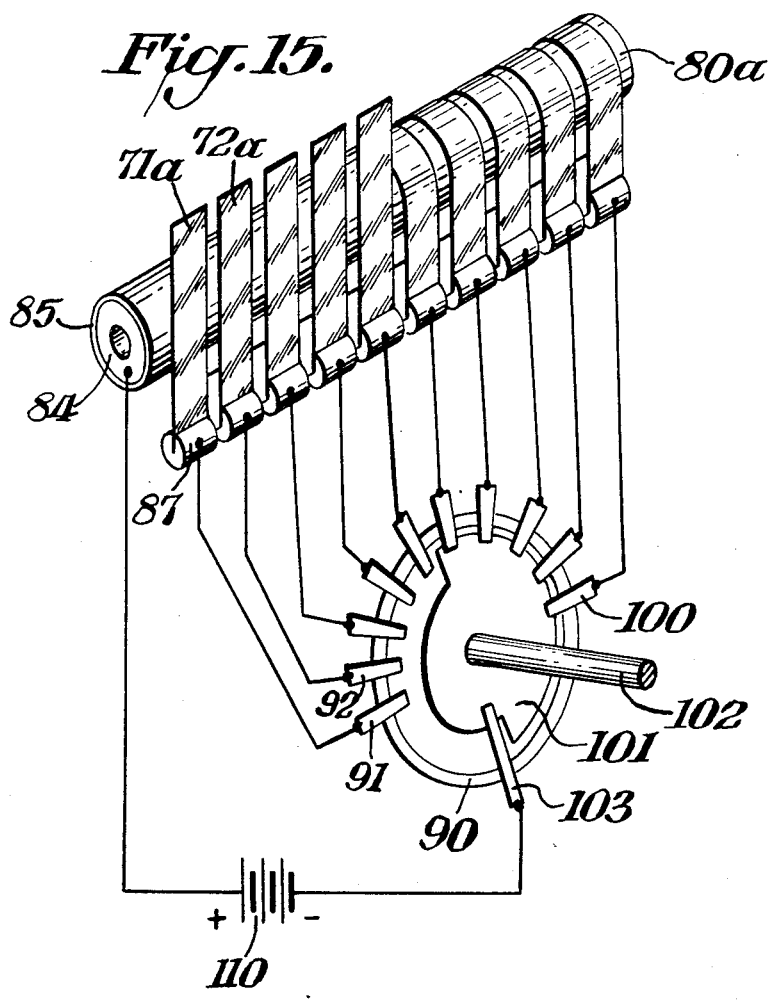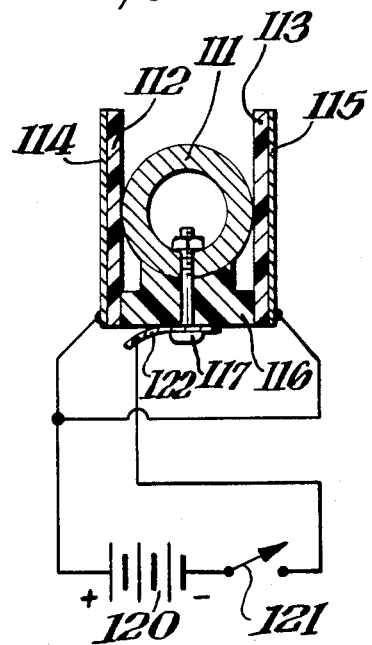

ELECTROSTATIC DISPLAY DEVICE WITH VARIABLE REFLECTIVITY

CROSS REFERENCES

This application is a continuation in part of my copending application Ser. No. 438,574 filed Feb. 1, 1974, now abandoned, which is a continuation in part of my application Ser. No. 294,590 filed Oct. 3, 1972, now abandoned.

BACKGROUND OF THE INVENTION

This invention relates to an optical display device and more particularly to a display device having variable reflectivity to ambient light.

A variety of optical display devices are known whereby moving pictures or data is presented by means of electrically illuminated lamps, light emitting diodes, cathode ray tubes and the like. Such devices generate their own light and are consequently most effective in an ambient of low light intensity.

Displays are known that operate so as to variably reflect ambient light such as signs having large moving reflector plates. Also more recently, liquid crystals have been developed that provide temperature and voltage variable reflectivities. The latter however can achieve only a limited range of reflectivities.

Generally the known display devices are each specialized to particular uses, each having one or more disadvantages such as limited reflectivity, large minimum size, narrow viewing angle, require high operating power, have high cost and incapable of effective use in high intensity light environments.

It is an object of this invention to provide a display device with a broad range of controllable reflectivities and capable of great contrast in ambients of high light intensities.

It is a further object of this invention to provide a display device having a wide viewing angle of greater than 120°.

It is a further object of this invention to provide a display device having memory capabilities.

It is a further object of this invention to provide a display device requiring low operating power.

SUMMARY OF THE INVENTION

An electrostatic display device having variable reflectivity has a fixed electrode with a curved surface of constant radius. The fixed electrode is opaque to light and is mounted to a base. A variable electrode being a sheet material is mounted to the base adjacent to the fixed electrode and parallel to the axis of said curvature. An insulative film covers the curved surface of the fixed electrode or covers the adjacent face of the variable electrode or both. Provision is made for connecting a voltage between the fixed and variable electrode so as to generate an electrostatic force therebetween and cause the resilient variable electrode to wrap over the curved surface of the fixed electrode. The fixed electrode has a distinctly different light reflective characteristic than the opposite face of the variable electrode and when the voltage is applied the device exhibits a distinct change in appearance. For example, one surface may be black and the other silvered or otherwise metallized. At least one of the mating surfaces of the two electrodes is roughened or contains depressions to attenuate pneumatic and other types of sticking. Since ambient light is generally omnidirectional, the fixed electrode having a curvature of constant radius makes it possible to achieve a broad effective viewing angle of 120° with little noticable loss of reflected light intensity at the extremes of the viewing range.

BRIEF DESCRIPTION OF THE DRAWINGS

FIG. 1 is a perspective or an array of electrode devices according to a first preferred embodiment of this invention;

FIG. 2 is an end-section of a part of FIG. 1 taken on line 2—2 in the direction of the arrows;

FIG. 3 is an end-section of a modified embodiment of the present invention;

FIG. 4 is a perspective view of a textured surface of a variable electrode of this invention;

FIG. 5 is a sectional view showing an interface between a textured variable electrode and a stationary electrode of this invention;

FIG. 6 shows an equivalent circuit of a display device of this invention;

FIG. 12 is a multiple ganged variable electrode;

FIG. 13 is an edge view of the ganged electrode of FIG. 12 taken in plane 13—13;

FIG. 14 is an edge view of the ganged electrode of FIG. 12 taken in plane 14—14;

FIG. 15 is a perspective view of a third preferred embodiment employing the ganged electrode of FIG. 12; and FIG. 16 shows an end-sectional view of a third preferred embodiment of a display device of this invention.

DESCRIPTION OF THE PREFERRED EMBODIMENTS

Figure 7:
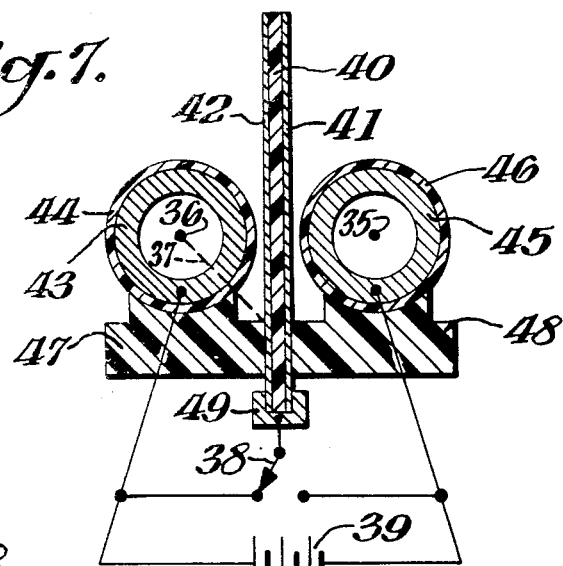
FIG. 7 is an end-section of a second preferred embodiment of this invention.

FIG. 1 is a perspective view of an array 10 according to this invention showing fixed electrodes 11 connected to the positive side of a power supply 13 and fixed electrodes 12 connected to the low side of the power supply 13.

Variable electrodes 14a, 14b, 14c and 14d are each supported between one of the electrodes 11 and one of the adjacent electrodes 12. The electrodes 14a, 14b, 14c and 14d are each held spaced away from the respective adjacent electrodes 11 and 12 in supporting shims 15. Wires 16 connect electrodes 11 to the high side of a suitable power supply and connect electrodes 12 to the low side of a suitable power supply. Double throw single pole switches 17a, 17b, 17c and 17d have their poles connected to variable electrodes 14a, 14b, 14c and 14d, respectively. Thus the variable electrodes may be individually polarized oppositely to either one or the other of the adjacent fixed electrodes. The end and the side of the array 10 is shown in phantom to show that the array elements can be repeated.

Several such arrays 10 may be located in a plane on a common base creating a matrix of adjacent pairs of fixed and variable electrodes, such that pictures may be generated by the matrix when certain of the pairs are electrified.

FIG. 2 is an end sectional view of a portion of the array 10 taken on line 2—2 of FIG. 1 in the direction of the arrows. The electrodes 11 and 12 have a cylindrical portion having a constant radius of curvature, e.g. 0.150 inch. The electrodes 11 and 12 are comprised of a conductive substance, such as conductive metal and are each covered at least over their curved portions with a thin insulating dielectric film 18, that is any suitable dielectric coating material meeting the requirements set forth herein. The electrode 14 has a core 19, a thin film of resilient polymer, such as a polyester, polycarbonate, polysulfone, polyethylene, polypropylene and has a thickness of the order of 0.0002 inch. Metallized coats 20 are deposited on both sides of the core 19. Aluminum is a suitable material for metallizing a thin layer of evaporated metal on the polymer core 19. The shims 15 are typically on the order of 0.003 inch thick and are comprised of an insulating material and have sufficient rigidity to form a support point for the electrode 14a. The support point is preferably remote from the axis defined by the curved portion of an adjacent fixed electrode by a distance of at least 1.2 times the radius of said curved portion although 1.5 times is preferred. This separation prevents flexing the variable electrode in the region near its base support point where tiny wrinkles may be formed in the thin variable electrode at mounting that resist flexing. Thus a more repeatable and reliable operation is achieved as will be better appreciated in the following description of operation of the display device.

Another embodiment is shown in FIG. 3. In this embodiment an electrode 21 is similar to electrodes 11 and 12 of FIGS. 1 and 2 while another electrode 22 is a stationary electrode serving to shield the variable electrode 14e electrostatically by connecting the variable and stationary electrodes to the same potential. The shielding electrode is especially useful in preventing interaction between two closely adjacent display devices of this invention. The electrodes 18, 14 and 22 are shown in FIG. 2 mounted to a base 29. Alternatively this assembly may be bonded or otherwise held together so as to form a base made up of the bottoms of the electrodes and the shims.

In FIG. 7 two fixed electrodes 43 and 45 are made of metal tubes being bonded to insulative base pieces 47 and 48, respectively. The base pieces are phenolic or injection molded thermoplastic material such as polypropylene. Between the base pieces 47 and 48 there is bonded a variable electrode having a sheete polymer core 40 and having films 41 and 42 of aluminum deposited on opposite faces. The axes 35 and 36 of the fixed electrodes 45 and 43, respectively, are parallel and each is spaced from the point of variable electrode mounting a distance (e.g. the dashed line 37) of about 1.5 times the radius of the fixed electrodes. The base pieces 47 and 48 may alternatively be all one piece with the variable electrode bonded in a slot therein, which slot is centered with respect to the fixed electrodes and parallel to their axes. A metal piece 49 is attached to the bottom of the variable electrode making electrical contact between metal films 41 and 42 and further serving as a terminal. A battery 39 is connected between electrodes 43 and 45. A single pole double throw switch 38 has its pole connected to terminal 49. Activating the switch causes the polarity of the variable electrode to change from that of one fixed electrode to the other.

Figure 8:
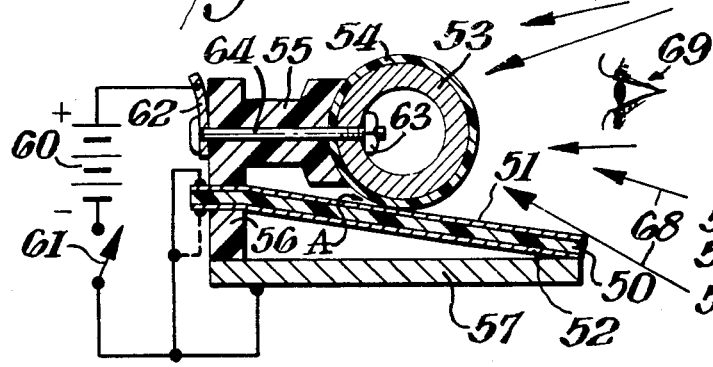
FIG. 8 is an end-section of a modified first preferred embodiment.

In FIG. 8 is shown a display device having a fixed electrode 53 with an insulative film 54 covering the curved outer surface thereof. The fixed electrode is mounted by means of a metal bolt 64 and nut 63 to a base piece 55 that is insulative. A variable sheet electrode is mounted to a portion of the base piece 55 so as to lie tangent to the insulated surface of the fixed electrode at point A. The variable electrode has a metal film 51 and a metal film 52 deposited on either side of a core sheet 50. A fixed shielding electrode 57 is mounted by shim 56 to the variable electrode and base. A terminal washer 62 bound under the heat of bolt 64 is connected to one side of a battery 60. The other side of the battery is connected through a switch 61 to the variable and shielding electrodes. In the presence of ambient light, indicated by arrows 68, an observer 69 sees the illuminated insulated fixed electrode surface.

Figure 11:
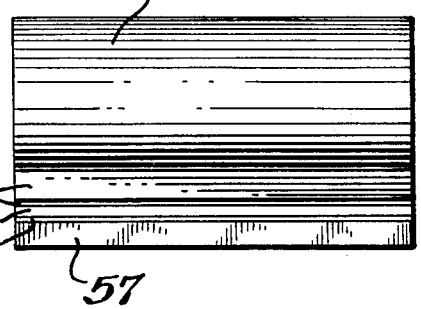
FIG. 11 is a side view of the display device of FIG. 8 as seen from about the middle of the observer's normal viewing position.
Figure 9:
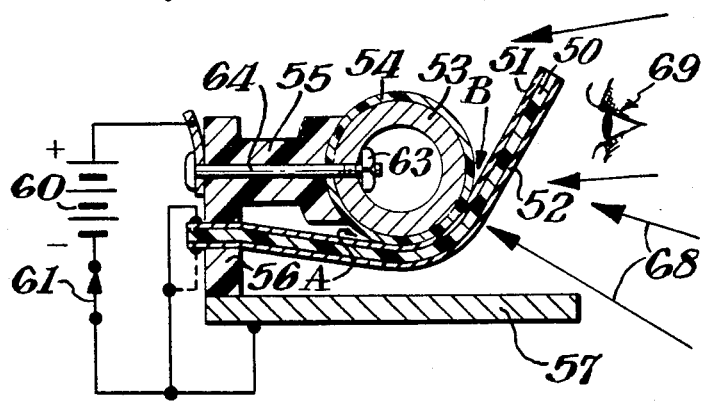
FIG. 9 is an end-section of the device of FIG. 8 seen during switching.
Figure 10:
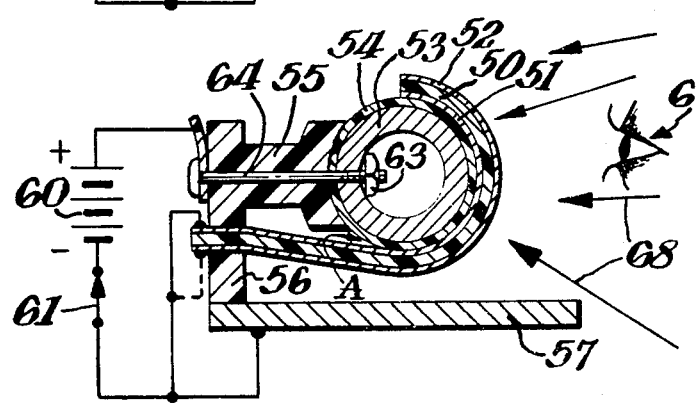
FIG. 10 is an end-section of the device of FIG. 8 seen after switching.

When the switch is closed, as seen in FIG. 9, the fixed and variable electrodes are oppositely polarized and the resilient variable electrode is electrostatically attracted to and begins to move into more intimate contact with the curved insulated surface of the fixed electrode. A point B of advancing contact moves in the counterclockwise direction. Finally, the variable electrode is in full contact with the fixed electrode as shown in FIG. 10, and the observer 69 sees the illuminated surface of the variable electrode. The observer's view of the display device of FIGS. 8, 9 and 10 is shown in FIG. 11.

Thus, when the reflective properties of the insulated curved surface of the variable electrode are quite different than that of the outer (as seen) portion of the attracted variable electrode, the observer sees a distinct change in the appearance of the display device as the switch is thrown.

It is therefore essential that the insulated fixed electrode be opaque although there are many means by which its color or light reflective properties may be varied. For example the insulative film 54 may be a clear polymeric resin such as polyethylene. Alternatively a very thin uniform coating (e.g. 0.00005 inch) of a clear Parylene (a Trademark of Union Carbide) may be vapor deposited thereon. The tube 53 may be of aluminum having black or green anodized surfaces. The outer aluminized variable electrode will be highly reflective providing a striking visual contrast therebetween.

The variable electrode moves under a spring-like tension about a pivot point B as shown in FIG. 9. This spring-like tension, being determined by a resilient property of the materials making up the variable electrode, is a vital factor determining its movement from its normal base position. Prototype display devices were made having variable electrodes made of 0.00014 inch polyethyleneterephthalate (e.g. MYLAR) bearing aluminum film, and fixed electrodes of 0.25 inch diameter rods having an insulative coating of polyvinylidene fluoride of about 0.00025 inch thickness. The prototype display devices appeared to "switch" instantaneously and operated reliably using a supply of about 35 volts.

Preferably the surface of the variable electrode is shaped in a pattern by introducing depressions into the otherwise smooth surface of the polymer film. This pattern may for example be a basket-weave or corrugations or as shown in the FIGS. 4 and 5 a waffle pattern. The pattern reduces sticking, thought to be essentially pneumatic sticking, and speeds the spring return action. Experiments have also indicated that when both the mating surfaces of the fixed and variable electrodes are smooth, there is a tendency to trap a layer of air that reduces the effective electrostatic force between them. Also, repeatability in the operating characteristics of display devices having smooth electrode mating surfaces is not as good as for those having at least one of the mating surfaces roughened. In creating a pattern of roughness in the mating surface of a variable electrode, care should be taken to provide a uniform pattern that will not create an unwanted bias in the flexability of that electrode. While it is preferred to provide spacings and/or openings which do not penetrate through the variable electrode, passages through the electrode making the electrode porous provide depressions and have a similar beneficial effect. Alternatively, the curved surface of the fixed electrode may contain depressions.

FIG. 4 is a variable electrode 23 having a main surface 24 in which waffle-like depressions 25 are hot-pressed to provide the non-polar surface for interfacing with a stationary electrode. In FIG. 5 a representational cross-section shows the electrode 23 on a stationary electrode 26 having a dielectric film 27 in which surface 28 interfaces with the variable electrode 23. The pockets formed by depressions 25 are readily seen.

Although the curvature of the fixed electrode may have a variety of shapes, it is preferred that it have a constant radius and be curved for at least 120° of arc especially to achieve a wide effective viewing angle. Curvatures of constant radius are found optimum for providing a combination of broadest effective reflective surface in the presence of omnidirectional ambient light and at the same time providing a surface to which a resilient electrode may be progressively attracted by electrostatic action. For reliable action the variable electrode should not tend to hit and slide on the fixed electrode but rather should wrap or roll over the fixed electrode in a progressive fashion, heretofore explained in reference to FIGS. 8, 9 and 10. Otherwise the action of a thin variable electrode is subject to wear and variations in sensitivity due to variations in the uniformity of the resilient properties along the variable electrode itself.

The broad surface of constant radius insures the uniform acceptance and reflection of ambient light through a very large viewing angle. The effective viewing angle is comparable in scope to the arc of unobstructed electrode curvature plus about 20° which corresponds to a variation of reflected light with viewing angle of no more than 2 to 1. For example, the display device of FIG. 8 has an effective viewing angle of about 110°, and this angle is even larger when the adjacent face 51 has a highly reflective or mirror finish, the effective viewing angle becoming greater than 130°. Furthermore, when the apparent brilliance of the device changes during operation from a low value to a high value, the ratio of "on" to "off" brilliance defines a figure of merit that remains substantially constant or varies no more than 2 to 1 over the entire broad effective viewing angle. For no other geometry of the fixed electrode, than one of constant radius would this be true.

The sensitivity of the display device is defined as the applied voltage that is just large enough to cause the variable electrode to "switch." The device is said to switch when the variable electrode is drawn over and is coadunate with the fixed electrode.

Switching occurs when the electrostatic force between fixed and variable electrodes is greater than the resisting spring force of the resilient variable electrode. Since the variable electrode moves by a progressive wrapping action about the fixed electrode, the sensitivity is a function of the thickness and dielectric constant of the insulating layer (e.g. 54 in FIG. 8) on the fixed electrode.

The attractive force per unit area which moves the variable electrode is less than the per unit area coadunate holding force, $$F = \frac{K V (c)}{d} ;$$

where
 $F$ is the electrostatic attractive force between electrodes
 $K$ is the dielectric constant of the solid layer separating the electrodes
 $V$ is the potential difference between electrodes
 $d$ is the thickness of the solid dielectric layer
 $c$ is a constant depending on units.

Thus an increase in the ratio of K/d causes the sensitivity of the device to increase and the minimum voltage required to switch the device decreases. The 0.00025 inch thick insulative coating of polyvinylidene fluoride, aforementioned, having a relative dielectric constant of 11 provides a K/d ratio of 44,000. This is clearly shown by the experimented data taken from two prototype display devices each made according to the first preferred embodiment of this invention as shown in FIG. 8 and each being the same except for the use of different material as the insulation layer 54. The resulting voltage thresholds $V_t$ for switching are presented in Table I below.

Table I

| Insulation Layer Parameters | | | | $V_t$ |
| --- | --- | --- | --- | --- |
| d (in.) | Type | K | K/d(in.$^{-1}$) | |
| 0.00025 | PVF | 11 | 44,000 | 35 volts |
| 0.00025 | MYLAR | 3.3 | 13,000 | 70 volts |

Polyvinylidene fluoride is abbreviated PVF in the table. The driving equipment necessary to provide signals for actuating display devices becomes especially expensive when switching voltages exceeding about 200 volts. Also the higher dielectric strength of insulating portions of the display device itself must cost more as voltages are increased. For these reasons display devices of this invention having values of K/d greater than 8,000 inverse inches are preferred but a range of values from 3,000 to over 10 million are suitable for use in the display device of this invention. If a tantalum oxide dielectric insulative film is used, a K/d ratio of about 7 million could be readily achieved by methods well known in the electrolytic capacitor art for preparing such films. Such films have an effective dielectric constant from about 21 to 27 and may be about $3 \times 10^{-6}$ inches thick, and have the additionally desirable property of reflecting light whose color is controlled by the interference characteristics of the oxide film thickness. For example dark green, blue, and purple films may be made in this fashion.

The insulation layer 54 may also be oxides of others of the valve metals such as aluminum, titanium. Although oxide films of the other valve metals such as aluminum are opaque and do not provide the selective spectral reflections as does tantalum oxide, they are generally excellent dielectric materials and may be advantageously employed in the display device of this invention.

The display device of the present invention also possesses a memory feature that advantageously permits for example a pulsed mode of operation. In FIG. 6 is shown an equivalent circuit diagram of the device as seen by the voltage source that may be connected to terminals 32 and 33. These terminals correspond to connections that are made as shown in FIG. 1 to a fixed electrode 11 and an adjacent variable electrode 14, respectively. The capacitor 30 represents the measured capacitance between the two electrodes 11 and 14, and the resistor 31 represents the leakage resistance in the base, the shim 15, and the dielectric coating 18 as seen more clearly in FIG. 2. When a switch such as switch 17a is momentarily closed as shown, and then placed in the middle open position, the residual charge on the capacitor 30 leaks off through the resistor 31, the RC product of the two determining how long it takes for the voltage and therefore the holding electrostatic force to diminish below the characteristic holding voltage of the device. External resistors may be parallel connected across the terminals 32 and 33 to shorten and obtain better control over this holding time. In experimental devices of this invention the natural holding time is found to be as long as several seconds. Others having an equivalent resistance of $10 \times 10^6$ ohms and capacitance of $0.001 \times 10^{-6}$ farads hold for about 0.01 seconds.

In general, there are many suitable embodiments depending upon the mode of operation. In the embodiment of FIG. 3 electrode 21 is black, and covered with the thin dielectric film 18. Electrode 14e is a thin film of polymer, such as polyester, coated on both sides with a thin layer of evaporated metal such as aluminum. Electrode 22 serves to shield the variable electrode 14e electrostatically but alternatively may be used for holding by applying a voltage between electrodes 22 and 14. Electrode 14e is mounted between two shims 15 of the order of 75 microns thick, in order to assure free movement from the electrode 22 and to allow gas (e.g. air) to flow between electrodes 21 and 22 and 14e, thereby minimizing the tendency toward pneumatic sticking. Since electrode 22 is always vertical, and electrode 14e is essentially vertical in the relaxed position, both of these are hardly seen at all or appear black in that they present a very small surface area for reflection as seen from the middle of the viewing range. At one extreme of the viewing range, more of the inner metallized surface of the variable electrode is seen and it reflects the dark hue of the fixed electrode by mirror image giving the whole device the same uniform appearance. But when 14e is engaged coadunately to 21, it appears bright silver, providing great reflective contrast.

An alternative embodiment is illustrated in FIG. 2. In this structure electrodes 11 and 12 are mechanically and electrically identical. Each, however, is a different color. Electrode 12 is yellow, and 11 is black. Each is covered by the thin dielectric film 18. Electrode 14a is yellow on the side adjacent to 12, and black on the side adjacent to 11. Thus, when 14a covers 12 the entire area appears black; and when it covers 11, the entire area appears yellow. It is apparent that if electrode 11 is negative, and 12 is positive, the polarity of the potential applied to 14a will determine in which direction it will move.

The device of this invention can operate outside a protective case, but it is more reliable inside a protective casing. The inside of the casing may be filled at atmospheric pressure with a dry inert gas such as nitrogen, or with air and/or nitrogen at atmospheric pressure and sealed. A faster response can be achieved when the casing is partially or wholly evacuated.

The device may be driven by either AC or DC. When raw AC, 115V 60 cycle is applied between electrodes 21 and 14e, the force between 21 and 14e is the "average value" of the AC potential between them; that is, it is always attractive and does not depend on polarity. As the memory of most devices is adequate to hold the variable electrode engaged while the potential is changing polarity, for many purposes the device actuates with raw AC the same as it does with DC.

Shades of gray, or in-between colors, are important in many display systems. It has been found that by adjusting the magnitude and frequency of an applied voltage, the variable electrode can be made to oscillate so as to provide a blurred appearance having an overall brilliance intermediate between the on and off brilliance. Mixed colors can also be generated in this way.

The device switches on extremely low power and once switched almost no power is required in the hold position. The energy required to drive a typical device is typically of the order of 6.4 to $10^{-6}$ joules (watt second)/cm$^2$ of variable electrode. The device significantly requires little energy and it can advantageously be driven through a very large resistance, such as 200,000 ohms. The device is cool and economical in operation and is suitable and safe for games, and teaching aids.

The multiple variable electrode 70 of FIG. 12 is made of a core sheet of plastic that has been metallized on both faces. During metallization strips are masked so that a plurality of spaced metallized regions are formed, pairs of such regions being registered with respect to each other on opposite faces. Alternatively metallization is accomplished without masking and strips are subsequently etched on the metallized film. Referring to the face view of FIG. 12 and the sectional-end view of FIGS. 13 and 14, ten such pairs are indicated. For example, the metallized regions 79a is opposite metallized region 79b. Also the spaces through which the plastic core 81 may be seen in FIG. 12 are partially notched (83) such that ten independently flexible variable electrodes 71–80 are formed.

In FIG. 15 the multiple electrode sheet 70 of FIG. 12 is shown having conductive terminals 87 connecting the two opposite metallized regions of each of the electrodes. The sheet 70 is mounted (mounting omitted for clarity) adjacent to a fixed electrode 84 having a tube shape and an insulative coating 85.

A single pole ten throw switch has an insulator ring 90 to which is mounted radially ten terminal strips 91–100. The switch has a conductive cam 101 that is rotatable by shaft 102. As the shaft 102 is rotated in a counterclockwise direction as shown, the cam 101 progressively contacts terminal strips 100, 99, 98 . . . and finally 91 in that order. A long terminal strip 103 always contacts cam 101. Connections are made between terminal strips 91–100 and variable electrodes 71–80, respectively. A battery 110 is connected between the fixed electrode and the terminal strip 103. Thus when the switch shaft is rotated counterclockwise the variable electrodes are actuated progressively beginning with electrode 80.

The display device of FIG. 15 may readily be employed as an indicator of shaft position, which in turn may be connected for example to a float in a liquid containing tank so that the number of variable electrodes actuated at any given time serves to indicate liquid level. This linear indicator is clearly suitable for many other such applications.

In a third preferred embodiment as shown in FIG. 16, a metal tube shaped fixed electrode without an insulative coating. One variable laminar electrode is made of an inner layer of insulating material 112 and an outer conductive metal layer 114 and another variable laminar electrode is made of an inner layer of insulating material and an outer layer of conductive metal. The variable electrodes are mounted on either side of and in symmetrical relationship to the fixed electrode, by being bonded to the base 116. The bolt 117 fastens the fixed electrode 111 to the base 116 and serves as an electrical connection between terminal lug 122 and the fixed electrode. When the variable electrodes acquire a potential relative to the fixed electrode as by closing the switch 121 in series with the battery 120, the variable electrodes wrap over the fixed electrode toward each other. The variable electrodes may be made long enough to overlap or not quite meet as desired.

The variable electrodes may be constructed of a metallized plastic sheet, as has been explained above. Alternatively the conductive layers 114 and 115 may be tantalum foil or other sheet material on which tantalum is deposited, and the insulating layers may be tantalum oxide formed by oxidizing a face of the tantalum foil or film. It will be possible to make a very sensitive display device by these means.

What is claimed is:

1. An electrostatic display device having variable light reflectivity comprising:
   a. one fixed electrode at least a portion of which has a curved surface of constant radius;
   b. a film of insulative material being deposited over said curved surface of said fixed electrode, said insulated fixed electrode being opaque to the transmission of light;
   c. a base to which said fixed electrode is mounted;
   d. one variable electrode being a sheet of resilient material and having at least one electrically conductive surface, said variable electrode being mounted to said base and standing adjacent to said fixed electrode with the plane of said variable electrode being parallel to the axis of said curved surface, said at least one conductive surface of said variable electrode facing said fixed electrode; and
   e. a connective means for connecting a voltage between said fixed electrode and said at least one conductive surface of said variable electrode, said insulated curved surface of said fixed electrode and the opposite surface from said at least one surface of said variable electrode having distinctly different light reflective characteristics, such that when a voltage is applied between said variable and said fixed electrode said variable electrode is electrostatically pulled and held coadunately over said curved surface and in the presence of ambient light a distinctive change occurs in the appearance of said device.

2. The display device of claim 1 wherein at least one of said facing electrode surfaces has depressions formed therein for the purpose of reducing pneumatic sticking between said electrodes.

3. The display device of claim 1 wherein said sheet of resilient material is a resilient polymer resin and said at least one conductive surface is comprised of a metal film.

4. The display device of claim 3 additionally comprising at least another variable electrode being spaced from said fixed electrode and mounted in said base parallel to said one variable electrode, said one and another variable electrodes having a symmetrical relationship with respect to said one fixed electrode, said at least another variable electrode having another metal film on an inside face thereof, and another connective means for making independent electrical connection to said another variable electrode.

5. The display device of claim 4 wherein a shim is mounted in each said space between said fixed and variable electrodes.

6. The display device of claim 1 wherein the location of mounting said variable electrode to said base is spaced from the axis of said surface of constant curvature of said fixed electrode by at least the distance of 1.2 times said radius of said curved surface for the purpose of removing the region of said variable electrodes that may be wrinkled near said mounting from the first point of active contact between said fixed and variable electrodes.

7. The display device of claim 1 additionally comprising a stationary shielding electrode having a plate shaped portion that is mounted in said base essentially parallel to and spaced from said variable electrode, said opposite surface of said variable electrode being adjacent to said stationary shielding electrode.

8. The display device of claim 1 wherein the ratio of the dielectric constant to the thickness of said insulative film is greater than 8,000 inverse inches.

9. The display device of claim 1 additionally comprising another fixed electrode at least a portion of which has a curved surface of said constant radius, and another film of insulative material being deposited over said curved surface of said another fixed electrode, said another insulated fixed electrode being opaque to the transmission of light, said one and said another fixed electrode being symmetrically mounted and disposed on said base relative to said variable electrode.

10. The display device of claim 1 additionally comprising at least another variable electrode having at least one electrically conductive surface and being mounted to said base and standing in said plane of said one electrode, said at least one conductive surface facing said fixed electrode, said variable electrodes being spaced in said plane from each other.

11. The display device of claim 1 additionally comprising at least another fixed electrode and at least another variable electrode, said another fixed and variable electrodes having the same features as and bearing the same mutual physical and work-relationships as said one fixed and variable electrodes, said one and said at least another electrodes sharing and being mounted to said base, the radius of curvature of said at least another fixed electrode defining an axis thereof, said axes of said fixed electrodes lying in one plane, said variable electrodes being mounted essentially perpendicular to said plane and being alternately disposed on said plane and being alternately disposed on said base relative to said fixed electrodes for the purpose of forming an array of two or more individually controllable display devices.

12. The display device of claim 1 wherein said insulative material is tantalum oxide and wherein the color of said insulated fixed electrode is determined by the spectral interference characteristics of said tantalum oxide.

13. An electrostatic display device having variable light reflectivity comprising:
 a. one fixed electrode at least a portion of which has a curved surface of constant radius, said fixed electrode being opaque to light;
 b. a base to which said fixed electrode is mounted;
 c. one variable electrode being a resilient laminar sheet comprised of at least one layer of electrically conducting material and at least one layer of electrically insulating material, said variable electrode being mounted to said base and standing adjacent to said fixed electrode with the plane of said variable electrode being parallel to the axis of said curved surface, said at least one insulative layer facing said fixed electrode; and
 d. a conductive means for connecting a voltage between said fixed electrode and said at least one conductive layer, the opposite surface of said variable electrode from said conductive layer having distinctly different light reflective characteristics than said curved surface of said fixed electrode, such that when a voltage is applied between said variable electrode and said conductive layer of said fixed electrode said variable electrode is electrostatically pulled and held coadunately over said curved surface and in the presence of ambient light a distinctive change occurs in the appearance of said device.

14. The display device of claim 13 wherein at least one of said facing electrode surfaces has depressions formed therein for the purpose of reducing pneumatic sticking between said electrodes.

15. The display device of claim 13 wherein said laminar variable electrode is comprised of a resilient polymer resin sheet having been metallized on one side.

* * * * *